April 6, 1965  G. C. LAMMERS  3,177,265
PROCESS FOR THE RECOVERY OF PARAXYLENE
Filed June 19, 1961
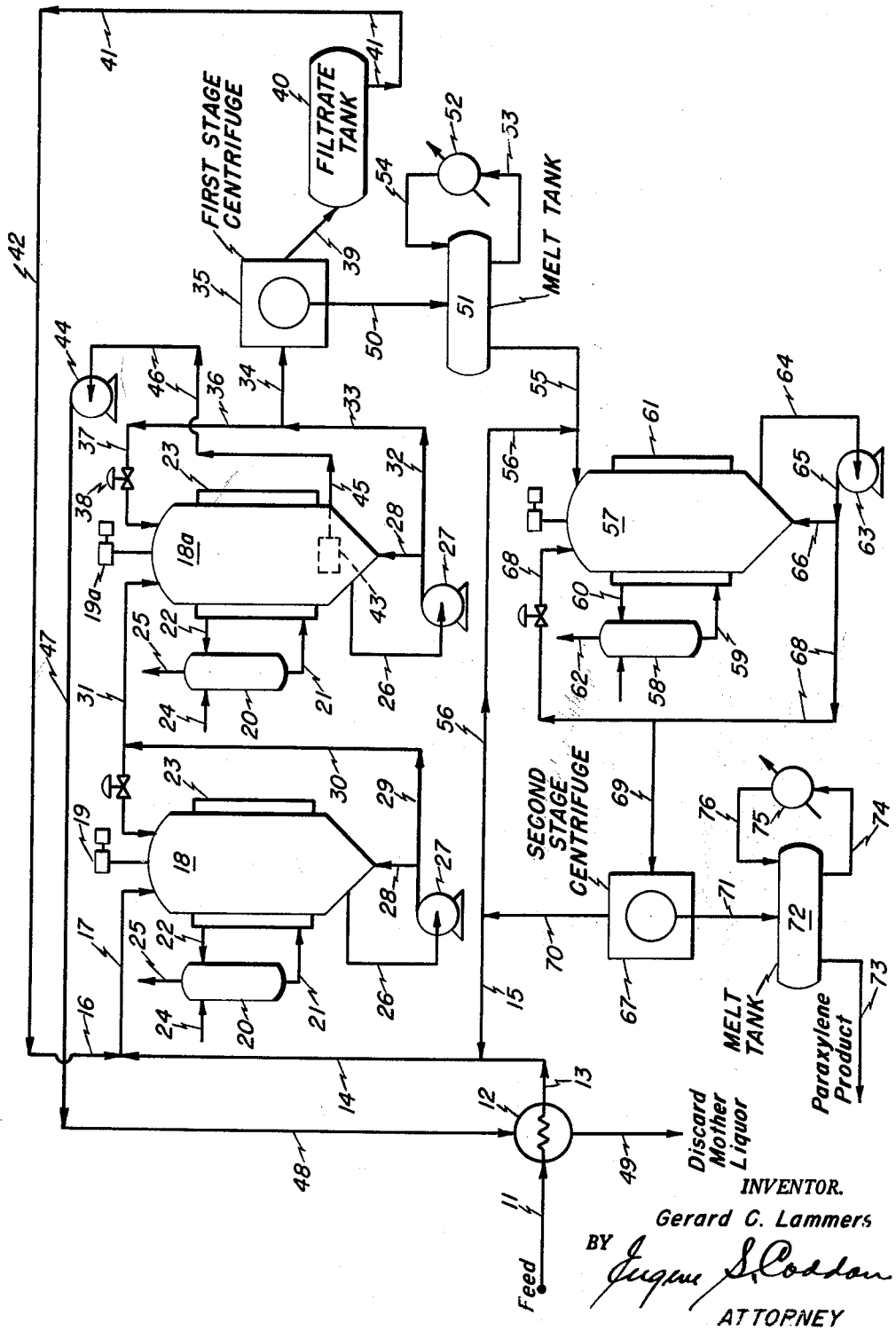
INVENTOR.
Gerard C. Lammers
BY
ATTORNEY United States Patent Office 3,177,265
Patented Apr. 6, 1965

3,177,265
PROCESS FOR THE RECOVERY OF PARAXYLENE
Gerard C. Lammers, Lansing, Ill., assignor to Standard Oil Company, Chicago, Ill., a corporation of Indiana
Filed June 19, 1961, Ser. No. 117,949
7 Claims. (Cl. 260—674)

This invention is concerned with the production of paraxylene from petroleum. More particularly, it relates to an improved process for recovering paraxylene by crystallization from a $C_8$ or mixed xylene feed in only two stages.

Although petroleum, more particularly reformate fractions produced in petroleum refining, provides a valuable source of paraxylene, separation of the paraxylene from associated, close boiling hydrocarbons presents a difficult commercial problem. Some areas of chemical demand require a paraxylene of at least 98% purity which means that it cannot be recovered by fractional distillation, or by simple crystallization in reasonable yield in an economically feasible way. There have been a number of approaches to the problem, using fractional crystallization, for example, but the high cost of the available processes in terms of equipment and operational expense makes further simplification highly desirable. Any improvement in ultimate yield improves the economic attractiveness of the process and reduces the unit cost.

A particularly efficient method for recovering paraxylene from petroleum fractions utilizes a two-stage crystallization process with centrifugal separation following each stage. By use of this method 98+% paraxylene product is obtainable. It has further been found that stepwise cooling in the first stage facilitates crystal growth which enhances ease of separation of the mother liquor from crystal cake. Further, it has been found that use of scraped tank crystallizers is particularly advantageous since in one vessel the feed can be cooled and the resultant slurry recirculated to cause agitation and crystal classification within the scraped tank crystallizer while providing ample holding time and crystal nuclei for crystal growth. This integral cooler-crystallizer eliminates the need of extra piping and insulation requirement in order to circulate the slurry in the conventional manner from a holding tank through an external chiller back to the holding tank. The scraped tank crystallizers used in this process are maintained at substantially constant temperature by only heat transfer through at least a portion of the walls of the crystallizer.

Briefly, the present invention may be described as a method of improving the ultimate yield of high purity paraxylene obtained in a two-stage crystallization process by removing only the following two streams from the process: (1) mother liquor isothermally withdrawn directly from the last scraped tank crystallizer in the first crystallization stage and (2) 98+% paraxylene product withdrawn from the second stage separation zone.

According to my invention, a mixed xylene feed derived from reformate, preferably by extraction so as to minimize paraffinic hydrocarbons, is charged to the first stage of a crystallization process along with recycle mother liquor obtained from the second stage separation. The combined feed is cooled in a plurality of steps to a crystallization temperature at or just above the first eutectic temperature of the mixture, generally not less than $-110°$ F., but depending upon the composition of the feed and the relative distribution of its $C_8$ aromatic components. After providing about 4½ to 18 hours holding time in the first crystallization stage, in two or more crystallizers of the scraped tank-type, a portion of the mother liquor is isothermally withdrawn directly from the slurry contained in the last scraped tank crystallizer of the first crystallization stage. This withdrawn portion of mother liquor is discarded from the process. The remaining slurry is charged to a centrifugal separator wherein mother liquor is separated from a first stage crystal cake and all of the centrifugally separated mother liquor is recycled to the first crystallization stage.

The first stage crystal cake is melted and charged, along with second stage recycled mother liquor, to the second crystallization stage. In the second stage the charge mixture is cooled to a temperature within the range of about 15 to 40° F., again in a scraped tank crystallizer of the type used in the first stage. The resulting slurry of paraxylene and mother liquor is charged to a second stage centrifugal separator wherein a second stage crystal cake is separated from the second stage mother liquor. A portion of all of the second stage mother liquor is recycled to the second crystallization stage to maintain a manageable slurry and the remaining portion of all of the second stage mother liquor is recycled to the first crystallization stage. The second stage crystal cake is melted and withdrawn as 98+% paraxylene product. The only streams removed from the process are the portion of the first stage mother liquor isothermally withdrawn directly from the last scraped tank crystallizer of the first crystallization stage and the 98+% paraxylene product.

The practice of the invention in the above manner enables the highest ultimate yield of high-purity paraxylene product to be obtained. Heretofore, the normal practice has been to discard from the process mother liquor separated in the first stage centrifugal separator; however, due to the mechanical heat generated in the centrifuge, the paraxylene content of such a mother liquor is higher than the mother liquor in the slurry in the last scraped tank crystallizer. The most efficient form of separation in a paraxylene crystallization process is the use of the basket-type centrifuges which operate at very high speeds. Thus, mechanical heat is generated within the centrifuge which results in warming of the slurry charge and resultant cake from 10 to 20° F. above the temperature of the centrifuge charge. This rise in temperature causes a portion of the paraxylene crystals contained in the slurry to melt, thus resulting in a mother liquor of higher concentration of paraxylene than the mother liquor contained in the crystallizer. By isothermally withdrawing mother liquor from the slurry contained in the scraped tank crystallizer at the lowest crystallization temperature (i.e., the last crystallizer) the overall material balance of the paraxylene crystallization process is maintained and no heat is added to the mother liquor being rejected from the process prior to separation from slurry. Thus the mother liquor rejected from the process has the lowest possible paraxylene concentration.

In the first crystallization stage of the preferred practice of the invention, the mixed xylene feed including recycled mother liquor from the second crystallization stage, is cooled in the first crystallization stage stepwise by passing the mixture through a series of at least two successive scraped tank crystallizers. These crystallizers are jacketed to provide an integral cooling surface and are of sufficient volume to provide a total holding time of from 4½ to 18 hours, more advantageously, about 5 to 9 hours overall in the first stage. Each crystallizer is equipped internally with means providing mild agitation of the large mass of slurry contained therein and scraping means for preventing buildup of crystalline material on the internal surfaces of the crystallizer. Each crystallizer is also equipped externally with means for withdrawing a stream of slurry from the large mass of slurry contained in the crystallizer and recycling slurry into the bottom of the mass as a stream in a substantially vertical upward flow at a velocity sufficient to cause crystal classification and agitation of the large mass. The slurry of paraxylene crystals contained in each crystallizer is of a volume sufficient to provide ample crystal nuclei within the slurry so that the larger cyrstal particles may be constantly classified toward the bottom of the vessel where they can be withdrawn. The large mass contained in each crystallizer is maintained by indirect heat exchange with a cooling fluid at a substantially constant temperature by only heat transfer through at least a portion of the walls of the crystallizer. The total feed is cooled by indirect exchange with a cooling fluid to a temperature in the first crystallizer in the range of about −30° to −70° F., to a lower temperature in the final crystallizer in the range of about −85° to −105° F. The temperature in the large mass in the final crystallizer is more critical than the temperatures in the preceding crystallizers and normally is the lowest temperature within the above stated range which avoids precipitation of the next component or eutectic of the composition other than paraxylene to crystallize. In this way yield is maximized without sacrifice in purity of the ultimate product.

In order to obtain maximum ultimate yield of paraxylene it is necessary to discard from the process a reject stream having a paraxylene content as low as possible. Such a stream is the mother liquor contained in the paraxylene crystal slurry in the last crystallizer of the first crystallization stage. Mother liquor is isothermally withdrawn directly from the slurry contained in the last crystallizer of the first crystallization stage. This is accomplished by separation means contained within the scraped tank crystallizer which enables the mother liquor to be separated from the crystals of the slurry at the temperature of the slurry in the final scraped tank crystallizer. Thus the discarded mother liquor is separated from slurry which is at the lowest temperature in the process. This discard operation avoids the mechanical heating up of the slurry in the centrifugal separator and the resultant melting of paraxylene crystals in the slurry. Only sufficient mother liquor is withdrawn from the last crystallizer in the first crystallization stage to maintain a material balance in the process so that if the weight of the mother liquor withdrawn is added to the weight of 98+% paraxylene product withdrawn from the final separation zone, the sum will equal the weight of the feed of mixed xylenes charged to the process. All of the mother liquor streams separated in the first stage centrifugal separator and in the second stage centrifugal separator are recycled internally within the process.

The invention will be further described by means of an operating example illustrative of the flow diagram shown in the figure of the accompanying drawings.

In the figure the feed comprises a reformate cut containing by volume: 19.75% paraxylene, 18.01% orthoxylene, 41.43% metaxylene, 19.52% ethylbenzene, and 1.3% of $C_7$ and $C_9$ hydrocarbons. The feed is charged to the process through line 11, and precooled in precooler 12 in which it is exchanged with cold mother liquor (about −98° F.) which has been withdrawn from the last crystallizer of the first crystallization stage. The precooled charge is passed by line 13 to line 14 wherein it is combined with second stage mother liquor (about +30° F.) introduced by line 15 and first stage mother liquor (about −75° F.) introduced by line 16. The combined mixture is passed by line 17 to first scraped tank crystallizer 18. Crystallizer 18 and each of the other crystallizers used in the first and second crystallization stages is about 11 to 15 feet in diameter and 15 to 20 feet high and is surrounded by a cooling jacket from which a liquid is boiled to abstract heat from the contents of the crystallizer. In view of the size of the crystallizer and the fact that the crystallizer constantly contains crystal nuclei, it is important to keep the crystallizer surfaces clean and the crystallizer contents agitated in order to obtain sufficient heat transfer. In order that high heat transfer coefficient may be obtained, the crystallizer walls are scraped by scrapers, not shown, which are mounted on a central shaft and driven by suitable mechanism 19. The crystallizer is cooled by circulating liquid ethylene as a refrigerant from ethylene surge drum 20 by means of lines 21 and 22 through external jacket 23 of the crystallizer. The temperature is controlled through the pressure on the surge drum. Ethylene is added through line 24 and vented through line 25. Ample crystal nuclei are maintained in the crystallizer and there is a constant classification of the crystals therein so that the larger crystal particles can be constantly withdrawn. In order to obtain such classification and, likewise, to supplement the scraper action maintaining agitation, about 400 gal./minute of slurry are withdrawn through the bottom of the outer periphery of crystallizer 18 by means of line 26 and pump 27, most of which is returned by line 28 for upward injection at the center of the base of the crystallizer. A slip stream of slurry is passed by lines 29, 30 and 31 to second scraped tank crystallizer 18A. About 3 hours holding time is provided in each crystallizer for a total holding time of about 6 hours. The temperature in crystallizer 18 is −75° F. and in crystallizer 18A is −98° F. The slurry contained in crystallizer 18A is withdrawn through the bottom of the outer periphery of the crystallizer and recycled in an upward injection at the center of the base of the crystallizer in the same manner as in crystallizer 18. A slip stream of the slurry from crystallizer 18A is passed by lines 32, 33 and 34 to a single automatic batch centrifuge 35. More than one centrifuge can be used, if desired, according to the design considerations. The centrifuge is operated on a time cycle providing a charge time, followed by a spin time and an unloading time. Periodically the cake heel is rinsed. Since withdrawal of slurry from crystallizer 18A is on a cyclic basis, during the centrifuge spinning and unloading time slurry is continuously returned to crystallizer 18A via lines 36 and 37 through back pressure valve 38 to prevent settling of paraxylene crystals in the slurry lines. The paraxylene crystal cake obtained from centrifuge 35 has a cake dryness of at least 85% solids. Mother liquor containing 8.3% paraxylene is withdrawn from centrifuge 35 through line 39 to filtrate tank 40. All of this mother liquor is recycled through lines 41, 42 and 16 to the charge to scraped tank crystallizer 18.

In order to prevent a buildup of hydrocarbons other than paraxylene charged to the process, a reject stream of mother liquor is isothermally separated and withdrawn directly from crystallizer 18A by means of filter 43, pump 44, through precooler 12 by means of lines 45, 46, 47, 48 and 49. Filter 43 is a micro-metallic filter having micro openings which are of such size as to prevent plugging by paraxylene crystals. Since crystals will tend to mat on the surface of the filter, means, not shown, are provided for periodically back-flushing of the filter. A sufficiently large surface of micro-metallic filters is used to reduce to a minimum the velocity of the isothermally withdrawn mother liquor. Other types of filters may be used advantageously, such as screens which are provided with scraping means to assure the flow of mother liquor or solid-liquid cyclone separators which are known as mini cyclones. The screen surface of the filter may be arranged so that the arms of the scraper, which are rotated from a central axis, may be adapted to scrape the screen as the cooling surface scraper rotates. The mother liquor withdrawn directly from crystallizer 18A is at −98° F. and contains 6.9 weight percent paraxylene. The amount of mother liquor withdrawn through filter 43 is such that if the weight of the withdrawn mother liquor is added to the weight of the high purity paraxylene product withdrawn from the second stage centrifugal separator, the sum of these weights will equal the weight of the feed charged through line 11. Thus by this method of operation only a stream of mother liquor low in paraxylene content and a stream of high purity product are removed from the process. All other filtrates or separated mothers liquors are recycled within the process to yield the ultimate amount of paraxylene obtainable from the feed.

The crystal cake obtained in centrifuge 35 is unloaded by action of the usual centrifuge unloading knife and is dropped by connection 50 into melt tank 51. A stream of liquid is recycled via lines 53 and 54 and heater 52 to keep the mixture in the molten state. The melted cake from melt tank 51 is passed through line 55 to second stage crystallizer 57, which is the same type of scraped tank crystallizer as used in the first crystallization stage and which is cooled by propane (−20° F.) circulated from surge drum 58 by connections 59 and 60 through jacket 61. The temperature of the circulated propane is controlled by the pressure maintained in surge drum 58. Excess propane vapors are removed by line 62. Second stage mother liquor is recyled via line 56 to control the solids concentration of the second stage charge. The slurry contained in scraped tank crystallizer 57 is maintained at 30° F. Scraper means, not shown, are provided within scraped tank crystallizer 57 in order to mildly agitate the slurry and to keep the cooling surfaces free of crystals. Crystal classification and additional agitation are obtained by circulating slurry by means of pump 63 and lines 64, 65 and 66. Slurry is thus returned to the scraped tank crystallizer 57 by injection in an upward flow into the slurry mass, thereby causing agitation and crystal classification. Slurry is withdrawn from crystallizer 57 for charging to centrifuge 67 by taking a slip stream through lines 68 and 69. The second stage centrifuge is similar to the cyclically operated automatic batch centrifuge used in the first stage. Cycle times are provided for loading, draining, spinning and unloading. The second stage cake obtained from the centrifuge 67 has a dryness of better than 93% solids, usually better than 95%. The purity exceeds 98% paraxylene and may be increased up to about 99.2% paraxylene without loss of yield by raising the second stage crystallization temperature while increasing the recycle of mother liquor to the first stage, which is effected through lines 70 and 15. The crystal cake is unloaded from centrifuge 67 through connection 71 to melt tank 72 and withdrawn as a liquid product through line 73. The contents of melt tank 72 are kept in the molten state by recycling liquor through line 74, heater 75 and line 76.

It is essential to the efficient operation of the process utilizing my invention that the crystals in the last scraped tank crystallizer of the first crystallization stage be of sufficient size to be easily filterable from mother liquid. The advantages of using the scraped tank crystallizers are apparent when the integral operations of cooling, mixing, classifying and isothermally separating the mother liquor are obtained in one vessel. The essence of this invention is the removal from the process of a stream of components in the feed other than paraxylene having the lowest concentration of paraxylene possible and a stream of high purity paraxylene product. Since the use of centrifugal separators is the most efficient use for the bulk separation of paraxylene crystals from mother liquor in order to obtain paraxylene cake dryness high enough to yield a 98+% paraxylene product, the use of these centrifugal separators is essential to an efficient process, but nevertheless results in loss of product by mechanical heating during the separation. Rejection of the mother liquor separated by the centrifuge results in removing a mother liquor having a higher concentration of paraxylene than the mother liquor isothermally withdrawn from the last crystallizer in the first crystallization stage. By use of the improved operation of this invention 11% improvement in ultimate yield is obtained. If mother liquor separated in the first centrifuge is rejected from the system in order to maintain a balanced operation, 51,230 lbs./hr. of a 8.3 weight percent paraxylene stream will be rejected when charging 58,562 lbs./hr. of a feed containing 19.74% paraxylene. With these operations 7,332 lbs./hr. of a 99.1% paraxylene product is obtained. However, by isothermally withdrawing the reject mother liquor directly from the last scraped tank crystallizer in the first crystallization stage, only 50,404 lbs./hr. of a mother liquor containing 6.9% paraxylene need be rejected in order to maintain the process in material balance when charging the same feed in the same amount, i.e. 58,562 lbs./hr. All mother liquor obtained from the first stage and second stage centrifuges using the process of my invention is recycled within the process. Thus paraxylene which would normally be lost in the reject mother liquor stream is recycled for further recovery by crystallization. When charging the 58,562 lbs./hr. of the 19.74 % paraxylene, 8,158 lbs./hr. of 99.1% paraxylene product can be obtained which is a yield of 13.93% based upon the feed. Thus an 11% improvement in ultimate yield is obtained while 1.6% less mother liquor is rejected from the process.

While I have described my process as using two scraped tank crystallizers in the first stage and one scraped tank crystallizer in the second stage, it is to be understood that more than two crystallizers may be utilized in the stepwise cooling of the first stage, as well as more than one scraped tank crystallizer may be used in the second stage. In addition, more than one centrifuge may be utilized in either the first or second stage separation. I have described filters for use in separating the mother liquor directly from the last crystallizer in the first crystallization stage as being micro-metallic filters, scraped screen filters or solid-liquid cyclones. Other mechanical devices for effecting the isothermal separation of mother liquor from the slurry in the last crystallizer will be apparent to those skilled in the use of this equipment. In addition, I have described the filter as being in the last crystallizer of the first crystallization stage. However, it should be understood that the mother liquor is to be withdrawn from the slurry at the coldest temperature in the first crystallization stage and thus if a crystallizer other than the last crystallizer is operated at the lowest temperature, mother liquor may be isothermally withdrawn and rejected from such other crystallizer. While it may be found advantageous to place the filter in the lower section of the scraped tank crystallizer, it can also be placed in a midpoint or the upper section of the crystallizer.

Other modifications and improvements of the process will be apparent to one skilled in the art.

What I claim is:

1. A continuous two-stage process for the separation of paraxylene by crystallization from a mixed xylene feed wherein the only streams removed from the process are a 98+% paraxylene product and mother liquor withdrawn directly from the coldest zone of the first crystallization stage, which process comprises charging the feed to a first crystallization stage of at least two refrigerated scraped tank crystallizers which are cooled only by heat transfer through at least a portion of the walls of each crystallizer, isothermally separating a portion only of crystal-free first stage mother liquor directly and continuously from the last scraped tank crystallizer of the first crystallization stage, said isothermal separation being carried out at the coldest temperature in the first crystallization stage, and discarding the separated portion from the process, withdrawing first stage slurry from the last scraped tank crystallizer of the first crystallization stage, charging said first stage slurry to a centrifugal separator, separating a first stage mother liquor from a first stage crystal cake, recycling all of the centrifugally separated first stage mother liquor to the first crystallization stage, melting the resultant cake, charging melted cake along with recycled second stage mother liquor to a second crystallization stage of at least one scraped tank crystallizer which is cooled only by heat transfer through at least a portion of the walls of each crystallizer, withdrawing second stage slurry from the second crystallization stage, charging second stage slurry to a centrifugal separator, separating a second stage mother liquor from a second stage crystal cake, recycling a portion of all of the separated second stage mother liquor to the second crystallization stage and recycling the remaining portion of all of the separated second stage mother liquor to the first crystallization stage, and withdrawing the second stage crystal cake from the process as said 98+% paraxylene product, said product and said separated portion being the only streams removed from the process.

2. An improved continuous two-stage paraxylene crystallization process wherein the only streams removed from the process are a 98+% paraxylene product and crystal-free mother liquor separated directly from the coldest zone of the first crystallization stage, said zone comprising a confined, continuous pool of paraxylene crystal slurry in mother liquor subjected to continuous cooling through the structure confining said pool.

3. In the separation of a 98+% paraxylene product from a mixed xylene feed in a continuous two-stage crystallization process which utilizes in the first stage thereof refrigerated scraped tank crystallizers, the improvement which consists of withdrawing from the process only crystal-free mother liquor separated directly from the refrigerated scraped tank crystallizer containing the coldest slurry in the first crystallization stage and said 98+% paraxylene product.

4. In a continuous two-stage process for the separation of paraxylene by crystallization from mixed xylene feed which process utilizes in the first crystallization stage at least two refrigerated scraped tank crystallizers which are cooled only by heat transfer through at least a portion of the walls of each crystallizer and utilizes in the second crystallization stage at least one scraped tank crystallizer which is cooled only by heat transfer through at least a portion of the walls of each crystallizer, the improvement which consists of charging the feed along with second stage mother liquor to the first crystallization stage, cooling the mixture of feed and recycled mother liquor in the first crystallization stage to obtain a first stage slurry, which slurry is maintained in the first crystallization stage for an average holding time of from 4½ to 18 hours, isothermally separating continuously only crystal-free mother liquor directly from the refrigerated scraped tank crystallizer containing the coldest slurry in the first crystallization stage, said isothermal separation being carried out at the temperature of said coldest slurry in the first crystallization stage, discarding from the process all of the withdrawn mother liquor, withdrawing slurry from the first crystallization stage, centrifugally separating the withdrawn slurry into a first stage mother liquor and a first stage crystal cake, recycling all of the first stage mother liquor to the first crystallization stage, melting the first stage crystal cake to obtain a first stage melt, charging first stage melt along with recycled second stage mother liquor to the second crystallization stage, cooling the mixture of first stage melt and recycled second stage mother liquor in the second crystallization stage to obtain a second stage slurry, withdrawing second stage slurry from the second crystallization stage, separating the withdrawn slurry into a second stage mother liquor and a second stage crystal cake, recycling a first portion of second stage mother liquor to the second crystallization stage, recycling a second portion of second stage mother liquor to the first crystallization stage, melting the second stage crystal cake and withdrawing from the process melted second stage crystals having a purity of 98+% paraxylene.

5. In a continuous two-stage process for the separation of paraxylene by crystallization from a mixed xylene feed wherein the feed is charged to a first crystallization stage of at least two refrigerated scraped tank crystallizers which are refrigerated by heat transfer only through at least a portion of the walls of each crystallizer, a first stage slurry is withdrawn from the first crystallization stage and charged to a first centrifugal separator wherein a first stage mother liquor is separated from a first stage crystal cake, all of the separated first stage mother liquor is recycled to the first crystallization stage, the separated first stage crystal cake is melted and charged along with recycled second stage mother liquor to a second crystallization stage of at least one scraped tank crystallizer which is cooled by heat transfer only through at least a portion of the walls of each crystallizer, a second stage slurry is withdrawn from the second crystallization stage and charged to a second centrifugal separator wherein a second stage mother liquor is separated from a second stage crystal cake, a portion of all of the separated second stage mother liquor is recycled to the second crystallization stage and the remaining portion of all of the separated second stage mother liquor is recycled to the first crystallization stage, and the separated second stage crystal cake is melted and withdrawn from the process as a 98+% paraxylene product, the improvement which comprises isothermally separating a portion of only crystal-free first stage mother liquor directly and continuously from the slurry contained in the last refrigerated scraped tank crystallizer of the first crystallization stage in an amount such that if the weight of said portion of withdrawn first stage mother liquor is added to the weight of the withdrawn 98+% paraxylene product the sum will equal the weight of the charge to the two stage process.

6. A continuous process for maximizing product yield in the manufacture of paraxylene of 98+% purity which process comprises two crystallization stages, the first of said stages comprising at least two refrigerated continuous confined crystallization zones, and in which crystal-free mother liquor is separated directly and continuously from the coldest of said zones, said crystal-free mother liquor and 98+% purity paraxylene product being the only process streams withdrawn from the process.

7. In a crystallization process for producing paraxylene, which comprises at least two stages, the improvement which comprises maintaining in the first of said stages at least two refrigerated continuous confined pools of paraxylene crystals slurried in mother liquor, continuously and directly separating crystal-free mother liquor from the coldest of said pools (from such of said pools as is maintained at the lowest temperature) and withdrawing from said process only said crystal-free mother liquor and product paraxylene.

References Cited by the Examiner
UNITED STATES PATENTS

| | | | |
|---|---|---|---|
| 2,795,634 | 6/57 | Hoff et al. | 260—674 |
| 2,810,772 | 10/57 | Bennett et al. | 260—674 |
| 2,820,070 | 6/58 | Bennett et al. | 260—674 |
| 2,848,507 | 8/58 | Bennett | 260—674 |
| 2,866,833 | 12/58 | Spiller | 260—674 |

ALPHONSO D. SULLIVAN, Primary Examiner.